United States Patent [19]

Leikam

[11] Patent Number: 5,571,041
[45] Date of Patent: Nov. 5, 1996

[54] REFINISHING COMPACT DISKS

[76] Inventor: Josh K. Leikam, 11258 W. 74th Pl., Arvada, Colo. 80005

[21] Appl. No.: 433,630

[22] Filed: Apr. 21, 1995

[51] Int. Cl.$^6$ .................................................. B24B 1/00
[52] U.S. Cl. ................................................ 451/37; 451/63
[58] Field of Search ............................ 451/307, 41, 59, 451/54, 63, 397, 398, 60, 57; 427/155

[56] References Cited

U.S. PATENT DOCUMENTS

| | | | |
|---|---|---|---|
| 3,905,163 | 9/1975 | Kleiber | 451/54 |
| 4,116,714 | 9/1978 | Basi | 451/54 |
| 5,065,547 | 11/1991 | Shimizu et al. | 451/317 |
| 5,081,795 | 1/1992 | Tanaka et al. | 451/398 |
| 5,102,099 | 4/1992 | Brown et al. | 51/129 |
| 5,193,316 | 3/1993 | Olmstead | 451/63 |
| 5,441,763 | 8/1995 | Kuo | 451/57 |
| 5,447,464 | 9/1995 | Franklin et al. | 451/57 |
| 5,482,497 | 1/1996 | Gonnella et al. | 451/57 |

*Primary Examiner*—D. S. Meislin
*Assistant Examiner*—Andrew Weinberg
*Attorney, Agent, or Firm*—Edwin H. Crabtree; Donald W. Margolis; Ramon L. Pizarro

[57] ABSTRACT

A method for repairing and refinishing an audio and video compact disk having a scratch or a plurality of scratches on a plastic cover bottom side of the disk. The scratch interfering with a laser beam reading digital information upwardly through the bottom side of the disk. The top side of the disk having a thin film layer of the recorded digital information secured thereon. The interference by the scratch causing an unwelcome "skip" during the play of the disk thereby lending its playing qualities unacceptable. The method of repair includes first inspecting the disk to determine the depth of the scratch. If the scratch is deep, a heavy cut, medium cut and fine cut cleaner may be used. The top side of the disk is then placed against the soft covered wheel and secured thereto. As the disk is spun at low rpm, the heavy cut cleaner is applied evenly across the surface of the bottom side of the disk using a clean cotton cloth or cotton pad. This step is repeated at higher rpm using a medium cut cleaner and then a fine cut cleaner is used. A clear plastic cleaner and a clear plastic polish are then applied using a cotton pad. The disk is then finally inspected for any remaining scratches. To further enhance the repair of the disk and extend the playing life of the disk, a clear plastic cover is applied to the top side of the disk to protect the recorded data thereon from permanent damage.

13 Claims, 2 Drawing Sheets

REFINISHING COMPACT DISKS

BACKGROUND OF THE INVENTION

1. Field of the Invention

This invention relates to the repair of disk recording media and more particularly, but not by way of limitation, to a method of repairing and refinishing an audio and video compact disk having scratches on a plastic cover bottom side of the disk.

2. Discussion of Prior Art

In U.S. Pat. Nos. 5,102,099 to Brown et al. and 5,099,618 to Schmid a disk polishing device and a method of repairing damaged digital recording disks are described. Both of these patents address the issue of repairing a damaged protective layer on a compact disk.

U.S. Pat. No. 5,045,116 to Cohen discloses a pre-moistened towelette which is used for cleaning the surface of a compact disk. The towelette is designed not to leave any visible residue on the disk surface. U.S. Pat. No. 4,853,922 to Funaki describes a cleaning device for optical disks and a method for cleaning the disk surface.

U.S. Pat. Nos. 4,842,132 to Wells, 4,817,652 to Liu et al., 4,182,686 to Laks et al. and 4,948,531 to Fuggini et al. discloses different types of compositions for cleaning hard surfaces along with a system for surface and fluid cleaning and a device for cleaning lenses used in telescopes, cameras, etc.

None of the above mentioned patents disclose or teach the unique method steps of repairing and refinishing the plastic surfaces of an audio and video compact disks as described herein.

SUMMARY OF THE INVENTION

In view of the foregoing, it is a primary object of the invention to provide a method of repairing damaged and nonuseable compact disks into a like-new condition which heretofore the disks were thrown away.

Another object of the present invention is to provide a way of repairing and refinishing an audio and video compact disk, CD ROMS, mini-disks, and the like with one or more scratches on a plastic cover bottom side of the disk.

Still another object of the invention is to repair a damaged compact disk inexpensively and eliminate the need to purchase a replacement compact disk.

Yet another object of subject method of repair is the addition of applying a clear plastic cover to a top side of the disk to protect recorded data secured thereon from permanent damage.

The subject method for repairing and refinishing an audio and video compact disk includes first inspecting the disk to determine the depth of the scratch on the bottom side of the disk. If the scratch is deep, both a heavy cut, a medium cut and fine cut chemical cleaner are used. Also an equal mixture of the heavy cut and medium cut chemical cleaner may be used. The top side of the disk is then secured against a soft covered wheel mounted on a drive shaft of a motor. As the disk is spun at low rpm, the heavy cut cleaner is applied evenly across the surface of the bottom side of the disk using a clean cotton cloth and/or cotton pad. This step is repeated at higher rpm using a medium cut cleaner and then a fine cut cleaner is used. The use of either a heavy cut cleaner, medium cut cleaner and fine cut cleaner will depend on the size and depth of scratch in the disk. A clear plastic cleaner and a clear plastic polish are then applied using a cotton pad. The disk is then finally inspected for any remaining scratches. To further enhance the repair of the disk and extend the playing life of the disk, a clear plastic cover is applied to the top side of the disk to protect the recorded data thereon from permanent damage.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
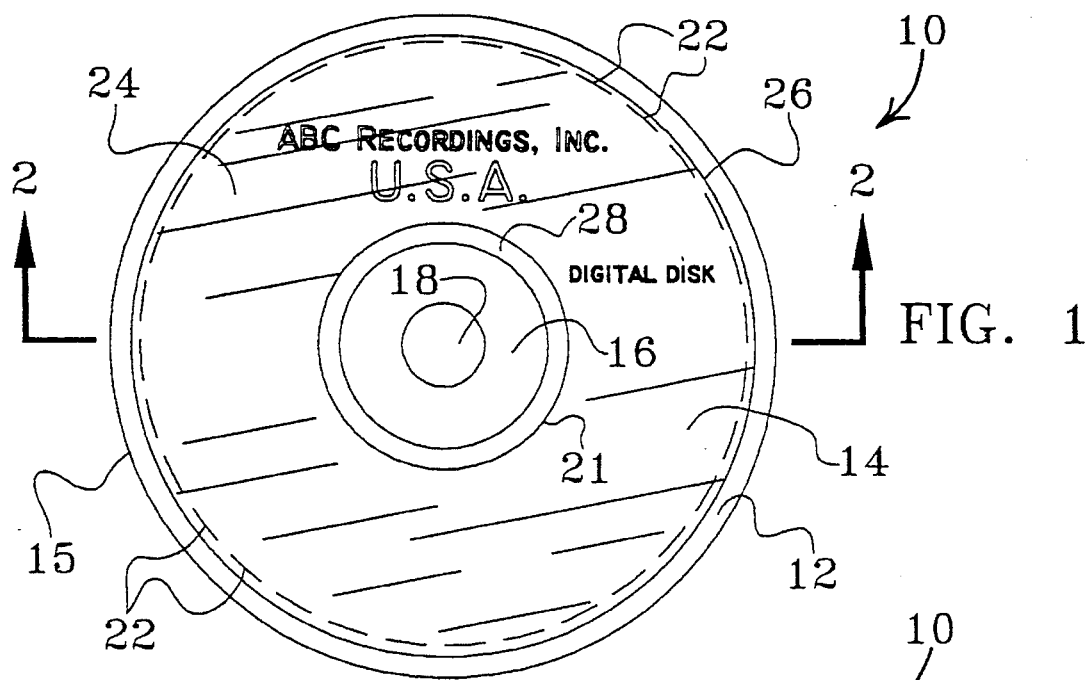
FIG. 1 is a top view of the top side of a compact disk with recording data thereon. Disposed on top of the recording data is a thin film clear plastic cover for protecting the data.

In FIG. 1, a top view of a compact disk, having a general reference numeral 10, is show with a top side 12 having a thin sheet of recorded data 14 secured to the top side 12. The disk 10 includes an outer circumference 15 and a hub 16 with a hole 18 through the center of the hub 16. Also, the disk 10 includes a plastic cover bottom side 20 shown in FIGS. 2, 4 and 5. The thickness of the plastic cover bottom side 20 is typically in a range of 1/16th of an inch. The disk 10 may be audio and video and may come in different sizes currently found in the market.

The recorded data 14, for example, will have general information as to the data recorded thereon such as the recording company and manufacture, list of songs or writings, name of entertainer or author, copyright notice, etc. The recorded data 14 secured on the top side 12 of the disk 10 is left unprotected and if scratched will permanently damage the disk 10 thereby making the data unusable. The recorded data 14 is shown with an inner circumference 21 and an outer circumference shown in dotted lines 22. The disk 10, shown in this view, includes a thin film clear plastic cover 24 having an outer circumference 26. The cover 24 has an adhesive in its bottom side and is designed to be secured on top of the recorded data 14 and protect the data 14 from being scratched and permanently damaged. The plastic cover 24 also includes an enlarged hole 28 received around the hub 16 of the disk 10

Figure 2:
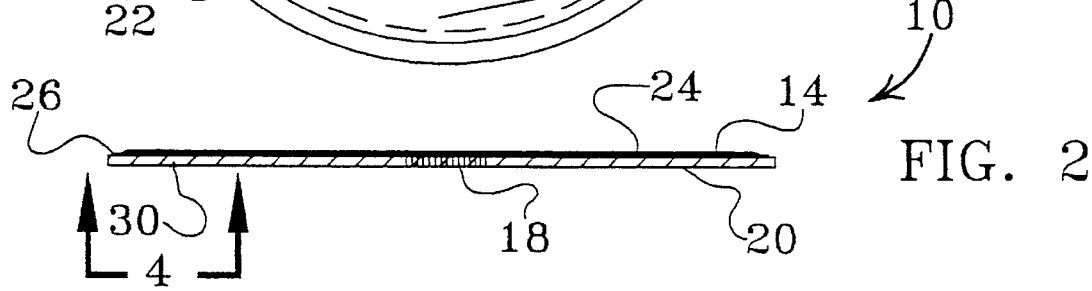
FIG. 2 is side sectional view of the compact disk taken along lines 2—2 shown in FIG. 1. In this view a small scratch is shown in the bottom side of the disk.

In FIG. 2, a sectional view of the compact disk 10 is shown taken along lines 2—2 shown in FIG. 1. In this view a scratch 30 is shown in the plastic cover bottom side 20. The scratch 30 interferes with a laser beam projected upwardly through the bottom side 20 and reading digital information on the recorded data 14 on the disk 10. The interference by the scratch 30 causes an unwelcome "skip" during the play of the disk 10 thereby lending its playing qualities unacceptable. The method of repair as described herein includes first inspecting the disk 10 to determine the depth of the scratch 30. If the scratch 30 is deep, both a heavy cut, medium cut and fine cut chemical cleaner are used.

Figure 3:
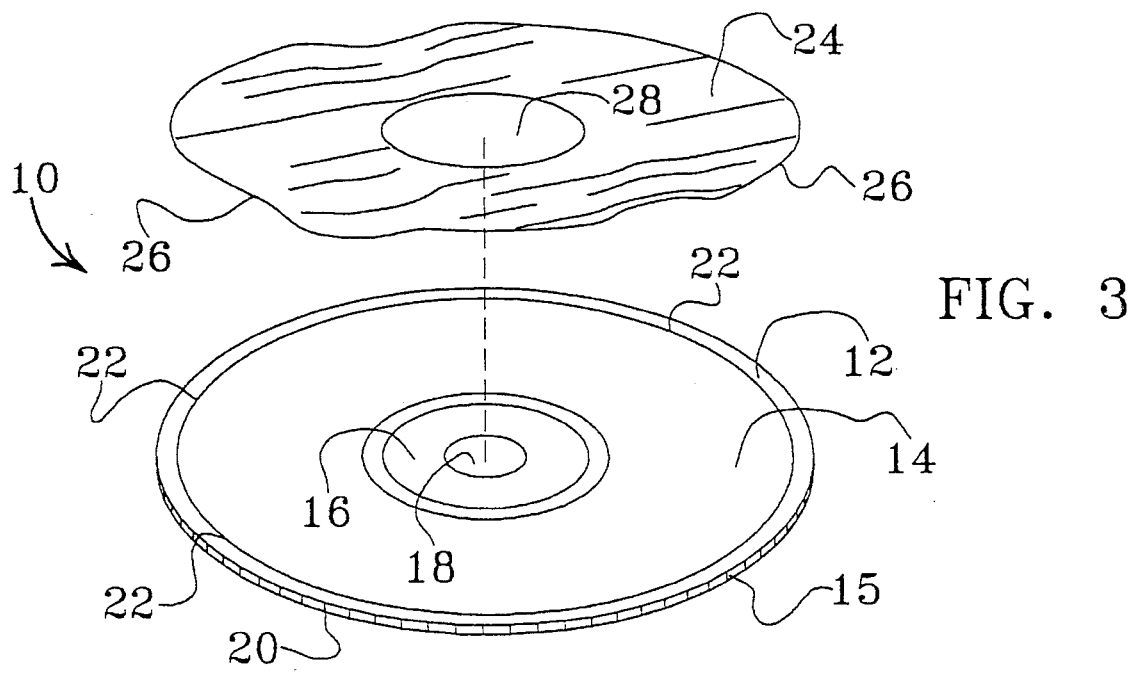
FIG. 3 is a perspective view of the compact disk with the thin film clear plastic cover in position for covering the recording data on the top side of the disk.

In FIG. 3 a perspective view of the compact disk 10 is shown with the thin film clear plastic cover 24 in position for covering the recorded data 14 on the top side 12 of the disk 10. The thin film clear plastic cover 24 has a thickness in a range of 0.003 to 0.010 inches in thickness. It has been found by trial and error that if the cover 24 is thicker than this range of thickness, the playing of the recorded data 14 is distorted. Also, if desired an additional plastic cover 24 may be added on top of the first plastic cover 24 as long as the overall thickness of the covers 24 does not interfere with the playing quality of the compact disk 10.

Figure 4:
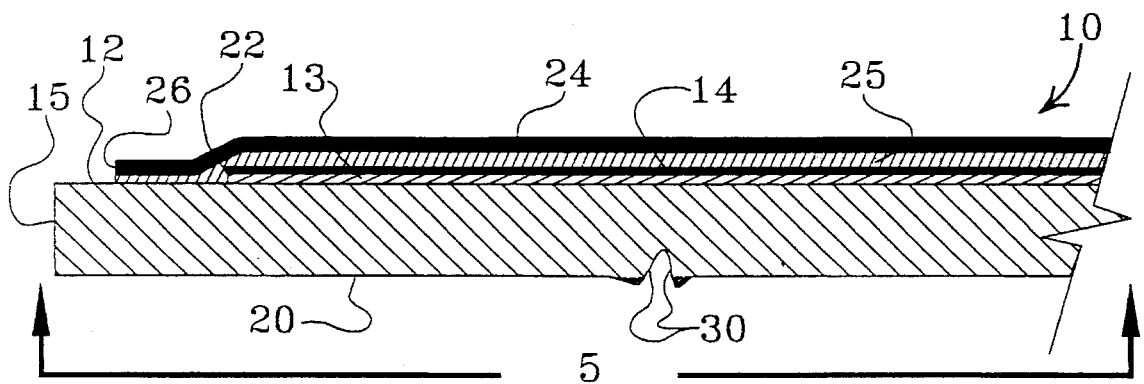
FIG. 4 is a greatly enlarged sectional view of a portion of the compact disk taken along lines 4—4 as shown in FIG. 2 and showing a deep scratch therein.
Figure 5:
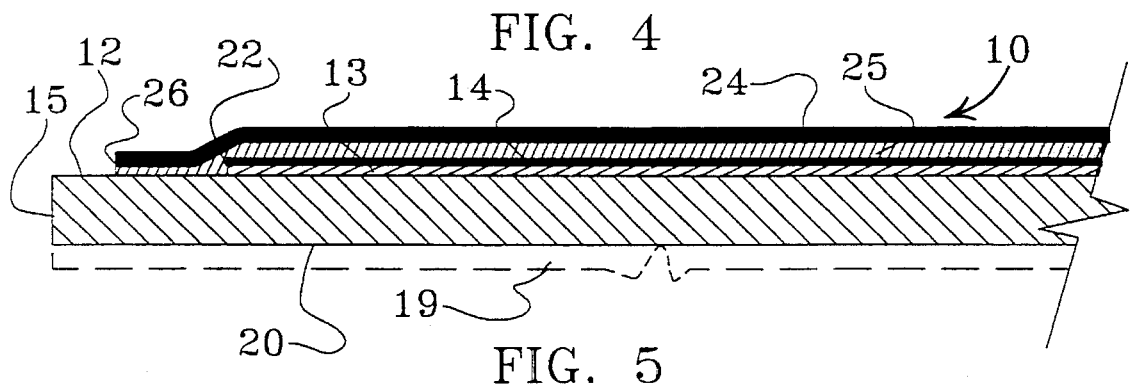
FIG. 5 is similar to FIG. 4 with the scratch removed from the plastic cover bottom side of the disk using the method steps of repair and refinishing as described herein.

FIG. 4 is a greatly enlarged sectional view of a portion of the compact disk 10 taken along lines 4—4 as shown in FIG. 2 and showing a deep scratch 30 in the plastic cover bottom side 20. This type of scratch, as mentioned above, renders the disk 10 useless in the playing of the data thereon. To place this disk 10 back into a like-new condition for acceptable playing quality, the scratch 30 must be removed in the bottom surface 20 by cleaning and polishing the surface 20. In FIGS. 4 and 5 the recorded data 14 is shown with an adhesive layer 13 for securing the data 14 to the top side 12. Also, the clear plastic cover 24 includes an adhesive layer 25 for securing the cover 24 to the top of the data 14 and the top side 12.

Figure 6:
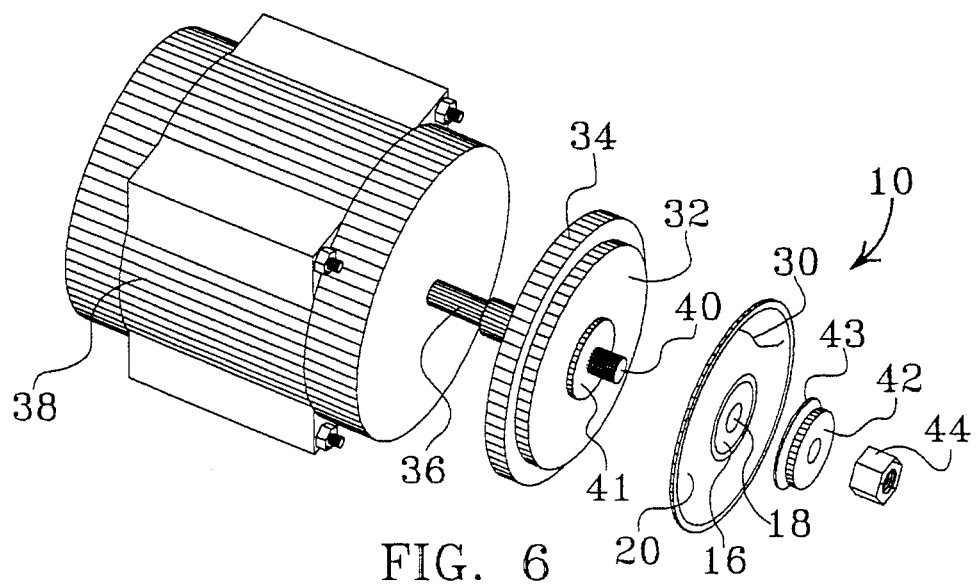
FIG. 6 is an exploded perspective view of a motor with a drive shaft and soft covered wheel for securing the compact disk thereon and practicing the method of repair and refinishing audio and video compact disks.

Referring now to both FIGS. 5 and 6, the method of repairing and refinishing the compact disk 10 is first started by inspecting the disk 10 to determine the number of scratches and the depth of the scratches and the bottom side 20. If the scratch 30 is deep, both a heavy cut, a medium cut and fine cut chemical cleaner are used. If the scratch 30 is merely a slight surface scratch, a fine cut cleaner is used along with a clear plastic cleaner and clear plastic polish. In FIG. 5, a portion 19 of the bottom side 20 is removed in order to completely remove the scratch 30.

It should be mentioned that because the digital information is read from the bottom up using a laser, the protection of the bottom side 20 is important. But in handling the disk 10, an owner or user of the disk will quite often carelessly drop or place the disk on a hard or rough surface causing scratches thereon. In viewing the scratch 30 and because the flat surface of the bottom side 20 is now distorted, the light from the laser is displaced causing the playing of the data information to "skip".

After inspecting the disk 10, the top side 12 of the disk 10 is then placed against a soft rubber foam cover 32 secured to a wheel 34 mounted on a drive shaft 36 of a variable speed motor 38. The soft foam cover 32 protects the top side 12 of the disk 10 from being scratched and allows the disk 10 to be slightly flexed without breaking the disk during its repair. To secure the disk 10 to the wheel 34, a threaded end 40 of the shaft 36 is received through the hole 18 in the hub 16 and a washer 42 and nut 44 are tightened on the threaded end 40 and against the hub 16. Also, rubber washers 41 and 43 are placed on opposite sides of the hub 16 for protecting the disk 10 and the soft foam cover 32. The motor 38 may be positioned horizontally, vertically or any other position that allows the operator access to the wheel 34. It should be noted that the wheel 34 must be covered by the soft foam cover 32 in order to grip the disk 10 but not stick to the disk 10. Therefore, when pressure is applied to the disk 10, the wheel 34 will not move faster than the disk 10.

For a deep scratch, a heavy cut cleaner is applied to the bottom side 20 using a clean cotton cloth or cotton pad. The different cleaners and the cloth are not shown in the drawings. Initially the motor 38 turns the shaft 36 at a low rpm, up to 500 rpm, as the heavy cut cleaner on the cotton cloth is moved back and forth across the face of the bottom side 20. For less deep scratches, an equal mixture of the heavy cut cleaner and a medium cut cleaner may be used during the initial step of grinding down the surface of the bottom side 20. Further, if the deep scratch is too deep, 600 to 3000 grit sand paper may be used initially prior to using the heavy cut cleaner. The sandpaper and disk 10 are cooled by water during the sanding process.

After cleaning the surface of the bottom side 20, the medium cut cleaner is now applied with a clean cotton cloth across the entire surface. Also, the rpm of the motor is increased to a range of 500 to 1800 rpm. This step is repeated with the medium cut cleaner depending on the depth of the scratch 30.

With a motor rpm increased to over 500 rpm, a fine cut cleaner is applied with a clean cotton cloth across the surface of the bottom side 20. Only medium pressure is applied by the cloth on the surface of the bottom side 20, since it has been found that if excessive pressure is applied by the cloth, the disk 10 may break or swirl marks will form on the surface causing disk skip. Further hard pressure applied to the bottom side 20 will cause the disk 10 to get excessively hot and damage to occur.

After the fine cut cleaner has been applied with medium pressure, another cotton pad is used with the fine cut cleaner and light pressure and any remaining swirl marks are removed from the plastic surface while the wheel 34 is spinning at a high rpm.

When the final use of fine cut cleaner is completed, a clear plastic cleaner is applied to the bottom side 20 using medium pressure. This step may be repeated two or three times with the last step applying the clear plastic cleaner with light pressure.

The final step is the cleaning of the bottom side 20 with a clean cotton pad and applying a clear plastic polish to the bottom side 20. An additional coating of clear plastic polish can be applied by hand and the surface then cleaned with a cotton pad or cotton cloth for removing any remaining swirl marks. The disk 10 is then removed from the wheel 34 by loosing the washer 42 and nut 44. The disk is finally inspected to see if all of the scratches have been removed.

In all of the above steps of the repair and refinishing of the disk 10, the different grades of cleaners may be used depending on the damage to the disk 10. In some cases it has been found that merely dust and finger prints can cause skipping. In this case, a fine cut cleaner or the clear plastic cleaner may be all that is required to touch up the surface along with a clear plastic polish applied as a last step.

Typical of cleaners used in the above method of compact disk repair are products made by Meguiar's Inc. Irvine, Calif. having a brand name of "Meguiar's Mirror Glaze" and marketed with a heavy-cut cleaner, a medium-cut cleaner, a fine-cut cleaner, a clear plastic cleaner and a clear plastic polish. These products are designed for removing surface defects such as stains, scratches, water spots, swirls and the like on plastic surfaces.

As mentioned above, the thin film plastic cover 24 is applied to protect the recorded data 14 on the top side 12. The cover 24 can be applied before the cleaning and polishing of the bottom side 20 or applied to the top side 12 after the repair of the scratches as described above. Further, the clear plastic protective cover 24 can and should be applied to the disk 10 before its initial use so as to further enhance the playing like of the disk 10 and help keep it from being permanently damaged.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A method for repairing and refinishing an audio and video compact disk having a scratch or a plurality of scratches on a plastic cover bottom side of the disk, the scratch interfering with a laser beam reading digital information upwardly through the bottom side of the disk, a top side of the disk having a thin film layer of the recorded digital information secured thereon, the steps comprising:

inspecting the disk to determine the depth of the scratch in order to select a type of chemical cleaner is to be used such as a heavy cut, a medium cut, and fine cut chemical cleaner;

placing the top side of the disk against a soft covered wheel and secured thereto, the wheel driven by a drive shaft on a motor;

applying a chosen chemical cleaner by hand evenly across the surface of the bottom side of the disk as the wheel is rotated by the motor;

applying a clear plastic cleaner and a clear plastic polish by hand evenly across the surface of the bottom side of the disk as the wheel is rotated by the motor;

removing the disk from the wheel and finally inspecting the bottom side for any remaining scratches; and applying a thin film clear plastic cover to the top side of the disk to protect the recorded data thereon from permanent damage.

2. The method as described in claim 1 wherein the thin film clear plastic cover has a thickness in a range of 0.003 to 0.010 inches.

3. The method as described in claim 1 wherein the chosen chemical cleaner is from a selection of a heavy cut, a medium cut and a fine cut chemical cleaner, the heavy cut chemical cleaner applied by hand to the bottom side with the wheel rotated at a speed up to 500 rpm, the medium cut chemical cleaner and fine cut chemical cleaner applied by hand to the bottom side with the wheel rotated at a speed up from 500 to 1800 rpm.

4. The method as described in claim 1 wherein the chosen chemical cleaner is applied by hand on the surface of the bottom side using a clean cotton cloth.

5. The method as described in claim 1 wherein the clear plastic cleaner and clear plastic polish are applied by hand on the surface of the bottom side using a clean cotton cloth.

6. A method for repairing and refinishing an audio and video compact disk having a scratch or a plurality of scratches on a plastic cover bottom side of the disk, the scratch interfering with a laser beam reading digital information upwardly through the bottom side of the disk, a top side of the disk having a thin film layer of the recorded digital information secured thereon, the steps comprising:

inspecting the disk to determine the depth of the scratch in order to select a type of chemical cleaner to be used such as a heavy cut, a medium cut, and fine cut chemical cleaner;

placing the top side of the disk against a soft covered wheel and secured thereto, the wheel driven by a drive shaft on a motor;

applying by hand a heavy cut chemical cleaner evenly across the surface of the bottom side of the disk as the wheel is rotated by the motor in a range of up to 500 rpm;

applying by hand a medium cut chemical cleaner and then a fine cut chemical cleaner evenly cross the surface of the bottom side of the disk as the wheel is rotated by the motor in a range from 500 to 1800 rpm;

applying by hand a clear plastic cleaner and a clear plastic polish evenly across the surface of the bottom side of the disk as the wheel is rotated by the motor;

removing the disk from the wheel and finally inspecting the bottom side for any remaining scratches; and applying a thin film clear plastic cover to the top side of the disk to protect the recorded data thereon from permanent damage prior to placing the disk on the wheel.

7. The method as described in claim 6 further including the step of applying a plurality of thin film clear plastic covers to the top side of the disk to protect the recorded data thereon from permanent damage prior to placing the disk on the wheel.

8. The method as described in claim 6 wherein the thin film clear plastic cover has a thickness in a range of 0.003 to 0.010 inches.

9. The method as described in claim 6 wherein the heavy cut, medium cut and fine cut chemical cleaners are applied by hand on the surface of the bottom side using a clean cotton cloth and cotton pad.

10. The method as described in claim 6 wherein the clear plastic cleaner and clear plastic polish are applied on the surface of the bottom side using a clean cotton cloth and cotton pad.

11. A method for repairing and refinishing an audio and video compact disk having a scratch or a plurality of scratches on a plastic cover bottom side of the disk, the scratch interfering with a laser beam reading digital information upwardly through the bottom side of the disk, a top side of the disk having a thin film layer of the recorded digital information secured thereon, the steps comprising:

inspecting the disk to determine the depth of the scratch in order to select a type of chemical cleaner is to be used such as a heavy cut, a medium cut, and fine cut chemical cleaner;

placing the top side of the disk against a soft covered wheel and secured thereto, the wheel driven by a drive shaft on a motor;

applying by hand using a clean soft cotton material an equal mixture of a heavy cut chemical cleaner and medium cut chemical cleaner evenly across the surface of the bottom side of the disk as the wheel is rotated by the motor in a range of up to 500 rpm;

applying by hand using a clean soft cotton material a medium cut chemical cleaner and then a fine cut chemical cleaner evenly across the surface of the bottom side of the disk as the wheel is rotated by the motor in a range from 500 to 1800 rpm;

applying by hand using a clean soft cotton material a clear plastic cleaner and a clear plastic polish evenly across the surface of the bottom side of the disk as the wheel is rotated by the motor;

removing the disk from the wheel and finally inspecting the bottom side for any remaining scratches; and applying a thin film clear plastic cover to the top side of the disk to protect the recorded data thereon from permanent damage prior to placing the disk on the wheel, said plastic cover having a thickness in a range of 0.003 to 0.010 inches.

12. The method as described in claim 11 further including the step of applying by hand sandpaper evenly across the surface of the bottom side of the disk as the wheel is rotated by the motor in a range of up to 500 rpm and prior to applying the mixture of the heavy cut and medium cut chemical mixture.

13. The method as described in claim 12 further including the step of applying water to the sandpaper and the rotating disk for cooling the sandpaper and rotating disk as the sandpaper is applied to the surface of the bottom side of the disk.

* * * * *